United States Patent [19]

Banzhaf et al.

[11] 4,235,124
[45] Nov. 25, 1980

[54] COUNTERBALANCED ROLLER FOR PAPER MACHINES

[75] Inventors: Heinz Banzhaf; Robert Dietrich, both of Heidenheim, Fed. Rep. of Germany

[73] Assignee: J. M. Voith GmbH, Fed. Rep. of Germany

[21] Appl. No.: 857,429

[22] Filed: Dec. 5, 1977

[30] Foreign Application Priority Data

Dec. 28, 1976 [DE] Fed. Rep. of Germany ....... 2659130

[51] Int. Cl.³ .............................................. F16F 15/22
[52] U.S. Cl. ................................................. 74/573 R
[58] Field of Search ......... 74/573; 192/30 V, 105 BA

[56] References Cited

U.S. PATENT DOCUMENTS

| 578,597 | 3/1897 | Davis .................................... 74/573 |
| 1,703,061 | 2/1929 | Coleman ....................... 192/105 BA |
| 2,331,756 | 10/1943 | Zobel .................................... 74/573 |
| 2,534,133 | 12/1950 | Kirkpatrick ................... 192/105 BA |

*Primary Examiner*—Samuel Scott
*Assistant Examiner*—Wesley S. Ratliff, Jr.
*Attorney, Agent, or Firm*—Ostrolenk, Faber, Gerb & Soffen

[57] ABSTRACT

A roller for a paper machine, including: a tube passing axially through the shell of the roller; a respective holder for each of a plurality of counterbalancing weights; the holders being annularly spaced around the tube; a spring pushing each holder around the respective weight supported thereon toward the inside surface of the roller shell.

14 Claims, 3 Drawing Figures

COUNTERBALANCED ROLLER FOR PAPER MACHINES

The invention relates to a roller for paper machines and, more particularly, to means for counterbalancing such rollers.

BACKGROUND OF THE INVENTION

Paper machines include guide rollers. Each such roller comprises a roller shell and a cap inserted in each end of the shell and each cap having an associated bearing neck. The rollers also have counterbalancing weights supported on them. Counterbalancing of such rollers is difficult and not sufficiently inexpensive to accomplish.

SUMMARY OF THE INVENTION

The principal object of the invention is to counterbalance a paper machine roller, of the above described type in an operationally safe and economical manner.

According to the invention, at least one individual counterbalancing weight is attached to the internal shell wall of the roller without damaging the shell. Attachment of each weight is made through an attaching element comprising a spring loaded clamping device. The clamping device includes a holder that is radially pushed in the direction of the roller shell internal wall by a respective biasing means. The radially outer end of the holder is developed so that a balancing weight can be inserted axially of the roller between the outer end of the holder and the roller shell internal wall. The holder is adapted to retain the weight in place and to prevent the weight from shifting with respect to the shell. For supporting the holder, a tube passes coaxially through the roller. Secured to the tube are guide supports for each holder that retain the holder at a particular circumferential orientation around the tube. The biasing means for each holder comprises a spring element that is compressed between the tube and the holder.

An adequate number of counterbalancing points around the roller shell must be selected for properly counterbalancing the roller. Under ideal conditions, a single counterbalancing point is adequate. Normally, however, eight counterbalancing points comprised of eight holders and respective counterbalancing weights is used. Frequently, fewer than eight counterbalancing points are adequate.

The above described placement of the counterbalancing weights has a number of advantages. The balancing weights sit so close to the roller shell that the shell absorbs the centrifugal forces of the balancing weight, while the clamping device, comprised of the holder and the compressed spring, is exposed to only minor force effects.

Simple and rapid emplacement of counterbalancing weights is enabled by the invention. Each counterbalancing weight can be screwed onto an insertion rod. The rod and supported weight are together passed through a bore in the front of the roller cap, are passed axially into the roller and are axially moved between the holder and the roller shell internal wall.

The large dimensional tolerances of commercial, i.e. rolled and centrifugally cast, roller tubes, can be easily compensated for by the device according to the invention. Thus, for instance, a 750 mm. roller tube diameter rated holder can have a counterbalancing weight spring range of 22 mm. Rollers can be made of weaker or thinner shells because the invention provides a maximally precise counterbalancing without any damage produced by rivets, or the like.

Identical size and shape holders can be used for various roller tube widths when the holders are arranged around a matchingly radially sized axial supporting tube that passes through the roller shell.

All parts of the counterbalancing means are fabricated of commercially available parts, which can be found easily virtually anywhere.

Further features of the invention are described in the following description and are shown in the accompanying drawings.

DESCRIPTION OF A PREFERRED EMBODIMENT

Figure 1:
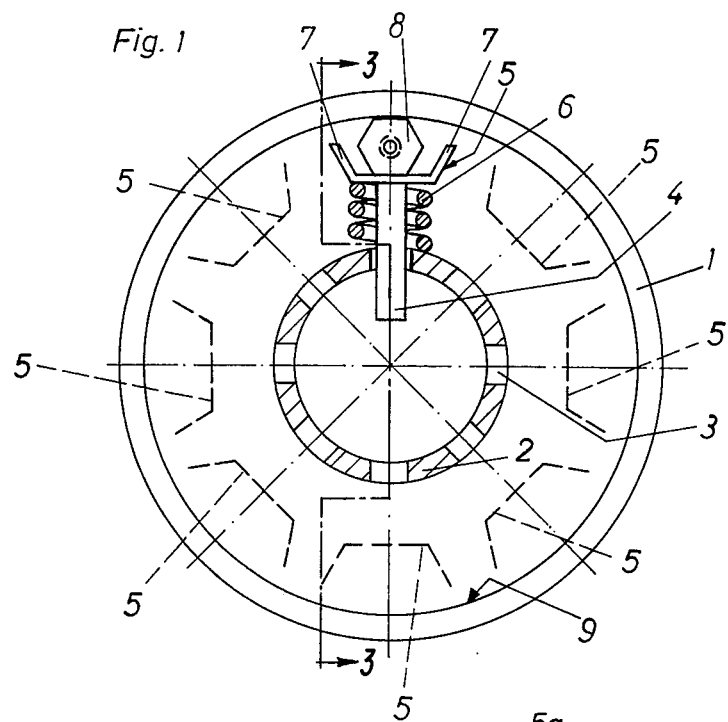
FIG. 1 is an end view of a roller that has been provided with a plurality of devices according to the invention.
Figure 3:
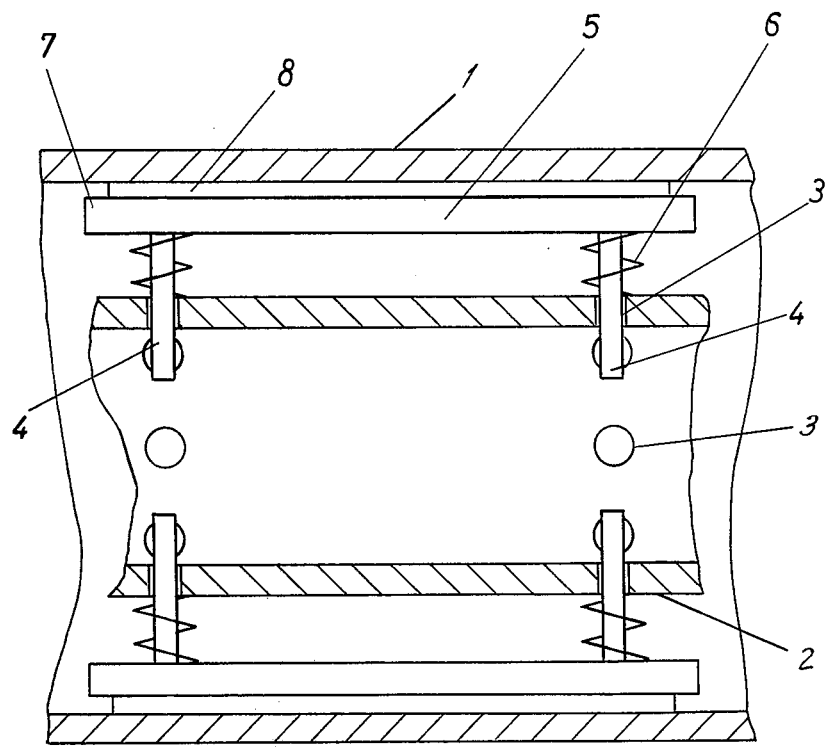
FIG. 3 is a cross-section along line III of FIG. 1.

In FIG. 1, one device according to the invention is shown in solid lines as being accommodated in a roller 1. The device includes a centrally disposed supporting tube 2 that is of smaller diameter than roller 1, that is radially spaced inwardly of roller 1 and that has at least one set, and more usually, a plurality of sets, e.g. eight sets, of radially disposed bores 3. The sets of bores are preferably uniformly annularly spaced around the tube 2. Further, the bores for the holders are symmetrically arranged around the tube. Each set of bores is on a line extending longitudinally along the tube 2, as shown in FIG. 3. A radially movable tubular guide 4 projects through each bore 3 in each set of bores that is in use for a particular paper machine roller counterbalancing arrangement. In the illustrated embodiment, there are two guides 4 for each holder. Therefore, a set of bores includes two bores 3 on a line extending longitudinally along the tube 2, as shown in FIG. 3. A holder 5 is attached at the radially outer end of each set of tubular guides 4. Between the holder 5 and the outside of the supporting tube 2 beneath it, there is a compressed compression spring 6 which is placed around each tubular guide 4. The spring 6 normally biases the holder 5 radially outwardly.

The radially outer end portion of the holder 5 is defined by a generally circumferentially oriented, longitudinally extending platform 5a and by two substantially radially outwardly extending walls 7 that are spaced apart and are at the circumferential edges of holder platform 5a. The walls 7 generally meet the holder platform at a slant. The walls 7 are short enough to provide peripheral clearance between their radially outer, peripheral ends and the internal wall 9 of roller 1. The walls 7 are shorter in height than the radial height of the balancing weight 8 that is placed on the holder 5 between the walls 7. The balancing weight 8 is pushed against the internal wall 9 of the roller shell by the force of the compression springs 6 for the respective holder. The friction between a respective holder 5 and the weight 8 thereon and between the weight 8 and the roller shell internal wall 9 prevents axial dropout of the counterbalancing weight 8. Slippage of the weight 8 in the circumferential direction is prevented by the holder lateral walls 7.

The front side of the counterbalancing weight 8 is provided with a screw threaded opening. A rod can be screwed into the threaded opening. By using the rod as a support, the weight 8 can be inserted from the front end of the roller 1 and can be inserted between the holder 5 and the roller shell internal wall 9. After insertion of the weight in the roller shell, the rod would be screwed out again.

In FIG. 1, only one balancing weight 8 and its respective holder 4, 5 is completely illustrated. At the seven other indicated counterbalancing points, the holders 4, 5 are indicated by broken lines. However, these holders would be structurally the same.

Figure 2:
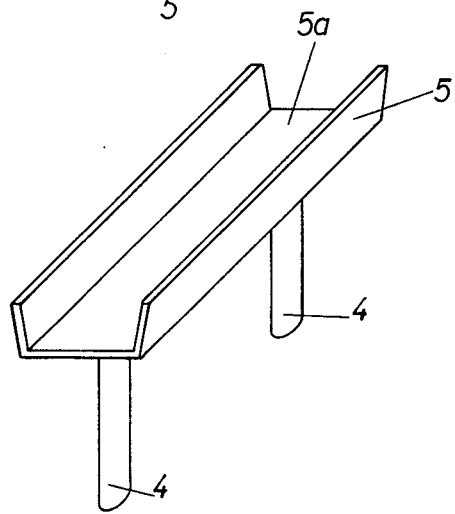
FIG. 2 is a perspective view of a major part of one such.

FIG. 2 shows that the holder 5 can be equipped with two tubular guides 4 which are axially spaced on a line extending longitudinally along the tube 2. Each of the guides 4 projects through a respective compression spring 6 and then through a respective bore 3 of the sets thereof in supporting tube 2. This results in safer axial guidance of the counterbalancing weight 8 and also precludes twisting of the holder 4, 5, whereby the holder can always remain parallel to the axis of the roller 1.

Now shown in the drawings, but known in this art, are the caps inserted in each end of the roller, with a respective associated bearing neck on each end cap.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A roller for a paper machine, or the like, comprising:
  an elongated roller shell; said roller shell including an internal wall;
  a clamping device inside said roller shell, angularly fixed with respect to said roller shell, and comprising at least one holder; each said holder extending axially of said roller; biasing means for urging each said holder radially toward said roller shell internal wall; each said holder having an axially elongated radially outer end portion which is shaped and adapted for supporting a counterbalancing weight between said holder outer end portion and said shell internal wall; said outer end portion of each said holder being shaped to enable an elongated counterbalancing weight to be inserted axially of said roller onto said holder.

2. The roller of claim 1, wherein there are a plurality of said holders in said roller.

3. The roller of claim 2, wherein said holders are placed symmetrically around said roller shell.

4. The roller of claim 2, further comprising a supporting device extending axially of and located inside of said roller shell and being radially spaced inwardly therefrom; said supporting device including support means for engaging and retaining each said holder to said tube while permitting said biasing means to continue to urge said holder radially outwardly; said biasing means urging each said holder radially toward said roller shell internal wall with such force that a weight on said holder outer end portion is urged into frictional engagement with said internal wall.

5. A roller for a paper machine, or the like, comprising a roller shell; said roller shell including an internal wall; a clamping device inside said roller shell and comprising at least one holder; each said holder extending axially of said roller; biasing means for urging each said holder radially toward said roller shell internal wall; each said holder having a radially outer end portion which is shaped and adapted for supporting a counterbalancing weight between said holder outer end portion and said shell internal wall; said outer end portion of each said holder being shaped to enable a weight to be inserted axially of said roller onto said holder; a plurality of said holders in said rollers; a supporting tube extending axially of and located inside of said roller shell and being radially spaced inwardly therefrom; said tube including a plurality of bores therein which are arrayed around said tube; a respective guide means on each said holder and received in a said bore in said tube for guiding radial movement of said holder while maintaining the axial and circumferential position of said holder in said tube.

6. The roller of claim 5, wherein said biasing means comprises a compression spring compressed between said tube and said holder.

7. The roller of claim 6, wherein each said bore is part of a respective set of said bores, and each said set of bores comprises a plurality of said bores arrayed in a row extending longitudinally of said tube; a respective plurality of said guide means on each said holder and received in the said bores of a said set thereof.

8. The roller of claim 7, wherein said biasing means comprises a respective said spring for each said tubular guide means.

9. The roller of claim 5, wherein said holder has a radially outer end portion that is comprised of two generally radially outwardly extending, laterally spaced apart side walls extending axially of said roller and a platform therebetween, for receiving on said platform and retaining between said side walls a counterbalancing weight for said holder; said holder walls having such a radially outwardly extending height as to provide peripheral clearance between the radially outer ends of said holder walls and said shell internal wall.

10. The roller of claim 9, further comprising a respective counterbalancing weight for each said holder and located on said holder platform between said lateral side walls thereof; said weight having a radial height such that there is peripheral clearance between said lateral wall radially outer ends and said roller shell internal wall.

11. The roller of claim 10, wherein said weight has an axially extending bore therein adapted for receiving a support and insertion rod whereby said weight may be supported and then inserted on said holder.

12. The roller of claim 9, wherein said biasing means urges each said holder radially toward said roller shell internal wall with such force that a weight on said holder outer end portion is urged into frictional engagement with said internal wall.

13. The roller of claim 9, wherein said biasing means urges each said holder radially toward said roller shell internal wall with such force that said weight on said holder outer end portion is urged into frictional engagement with said internal wall.

14. The roller of claim 5, wherein there are a plurality of said holders, each including a respective guide means, and each said holder guide means being received in a respective said tube bore.

* * * * *